May 17, 1949.  N. B. MURPHY  2,470,317
DISCONNECTIBLE COUPLING DEVICE
Filed Jan. 30, 1946
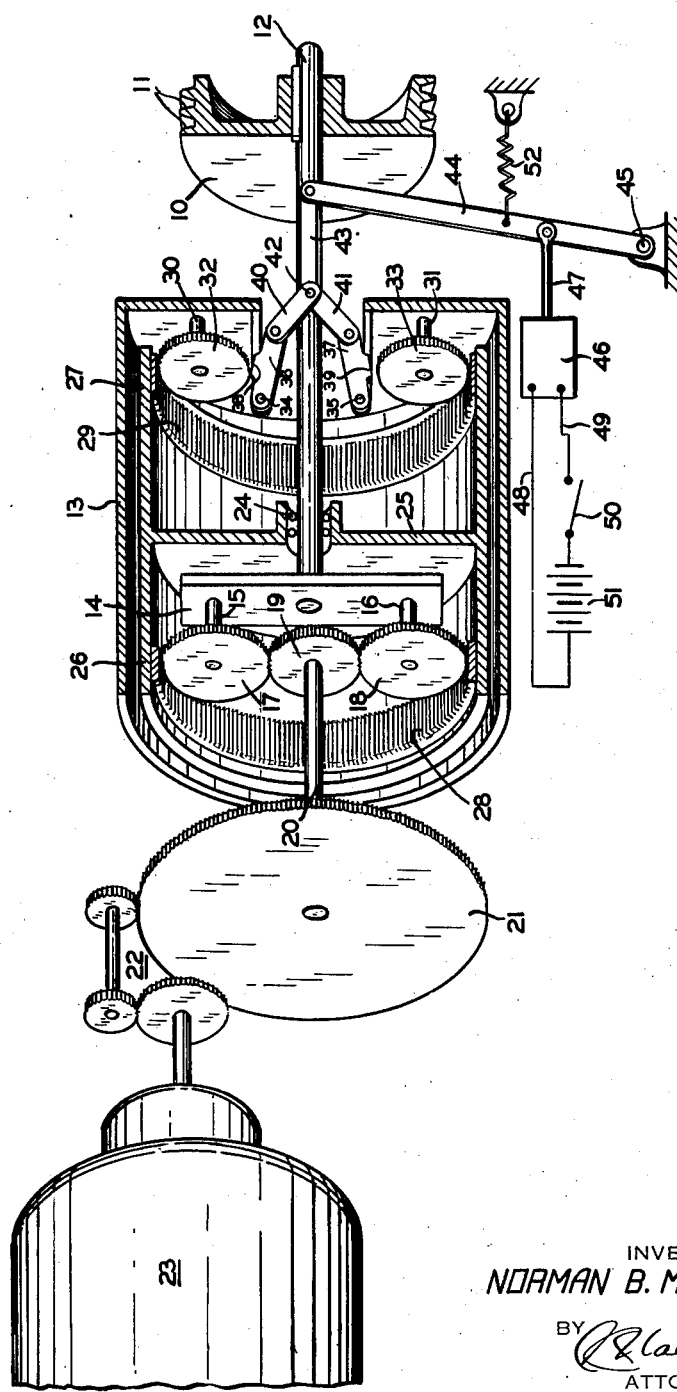
INVENTOR
*NORMAN B. MURPHY*
BY 
ATTORNEY Patented May 17, 1949

2,470,317

UNITED STATES PATENT OFFICE 2,470,317

DISCONNECTIBLE COUPLING DEVICE

Norman B. Murphy, West Englewood, N. J., assignor to Bendix Aviation Corporation, Teterboro, N. J., a corporation of Delaware Application January 30, 1946, Serial No. 644,223

4 Claims. (Cl. 74—785)

This invention relates to disconnect apparatus generally and more particularly to a remotely controlled disconnect or reconnect apparatus.

With the provision of automatic steering systems on air or other craft it became necessary to provide emergency disconnect devices so that the driving connection between the servo motors and their control surfaces could be broken at will in case of some failure in the system so that manual control of the surfaces could be readily taken over by the human pilot. Devices to this end generally are adapted for a disconnecting operation but because of their inaccessibility in flight, i. e., because of their location with the servo motors at or near the control surfaces they cannot be reconnected in flight, such operation being possible only after the craft has landed. This disadvantage is readily overcome by the novel apparatus of the present invention.

An object of the present invention therefore is to provide a novel device for connecting or disconnecting a driven member to or from a driving member.

Another object of the invention is to provide a novel reconnectable disconnect device for use in connection with an automatic steering system for air or other craft.

A further object is to provide a novel and remotely controlled connecting device for establishing or terminating a driving connection between a driven member and a driving member.

Another object is to provide a novel device for establishing a driving connection between a driven member and a driving member in the form of planet gears which ride on a locked internally toothed gear and are driven by the driving member to establish a drivable connection between the driving and driven members and which mesh with and drive the internally toothed gear when the latter is unlocked to thereby break the driving connection between the driving and driven members.

The above and further objects and novel features of the invention will appear more fully from the following detailed description when the same is read in connection with the accompanying drawing. It is to be expressly understood however, that the drawing is for the purpose of illustration only and is not intended as a definition of the limits of the invention.

The single figure of the drawing constitutes a side elevation view in section of the novel emergency reconnectable disconnect device of the present invention.

As more clearly shown in the drawing, element 10 represents a pulley or driven member adapted for accommodating in its peripheral grooves 11 a suitable cable (not shown) arranged between the pilot's manual control and the craft surface to be actuated. Pulley 10, moreover, is fixed or splined to a suitably journalled shaft 12 which extends into a fixed casing or housing 13.

The free end of shaft 12 located within housing 13 has fastened thereto a frame 14 which at its outer ends journals two stub shafts 15 and 16 adapted for carrying a pair of planet gears 17 and 18 thereon for rotation relative thereto, the two gears being spaced from each other and from frame 14 to be driven by a spur gear 19 carried by a shaft 20 which, in turn, supports a relatively large gear 21 constituting a portion of a speed reduction gear system 22 driven by a driving member in the form of a servo motor 23.

Furthermore, sleeved about shaft 12 and supported for rotation relative thereto by way of bearings 24 is an annular disc member or element 25 having outwardly extending flanges 26 and 27 which define hollow cylinders, each such cylinder being internally toothed as at 28 and 29. Planet gears 17 and 18 are in constant mesh with toothed portion 28 of disc 25 so that, in response to operation of motor 23, planet gears 17 and 18 through toothed portion 28 rotate disc 25 relative to shaft 12, the latter remaining stationary under this condition. Thus, even though planet gears 17 and 18 are rotating in response to motor operation, they simply drive disc 25 relative to shaft 12 and the latter, together with pulley 10 and its cable, remains fixed so that there is an absence of an effective driving connection between motor 23 and pulley 10.

In order to establish a driving connection between the motor and the pulley, novel means are provided for locking the disc 25 against rotation so that the planet gears 17 and 18 will creep or ride on toothed portion 28 to thereby angularly displace frame 14 and shaft 12 therewith whereby pulley 10 will be also displaced angularly and thus impart a control force to its related control surface. To this end, the closed end of housing 13 carries two stub shafts 30 and 31 which journal thereon spur gears 32 and 33 arranged in meshing relation with internally toothed portions 29 of disc 25. Thus, upon rotation of disc 25 by planet gears 17 and 18, the disc rotates spur gears 32 and 33 about their axes defined by stub shafts 30 and 31. Pivoted on a portion of housing 13, at points 34 and 35, are two links 36 and 37 provided with teeth 38 and 39 which, under certain conditions are swung into engagement with spur gears 32 and 33 to lock the latter against rotation whereupon disc 25 is also locked against rotation in which case spur gears 17 and 18 are caused to creep or ride on toothed portion 28 of the disc and thus angularly displace frame 14 and shaft 12 so that a drivable connection is established between pulley 10 and motor 23.

The free ends of toothed links 36 and 37 are pivotally interconnected through a pair of links 40 and 41, the latter links, at their free ends, being connected at a common pivot 42 with a link 43 which is spaced from shaft 12 and which is connected to an actuating lever 44 pivoted on a fixed point 45. As will now be apparent, links 36, 37, 40, 41 and 43 constitute a toggle mechanism which, in response to movement of lever 44 in one direction, is operative to have its links 40 and 41 extended outwardly to force teeth 38 and 39 of links 36 and 37 into engagement with spur gears 32 and 33 to lock disc 25 against rotation. Movement of lever 44 in the opposite direction, on the other hand, collapses the toggle mechanism to release spur gears 32 and 33 whereby disc 25 is released for rotation by spur gears 17 and 18.

For operating lever 44, a solenoid 46 is provided having a plunger 47 connected to the lever, the solenoid being connected by way of conductors 48 and 49 through a switch 50 with a suitable battery 51. Closing of switch 50, which may be located at or near the pilot's control panel, energizes the solenoid to force plunger 47 inwardly whereupon lever 44 is forced inwardly to force the toggle mechanism and links 36 and 37 to lock spur gears 32 and 33 and thereby establish the desired drivable connection. With the opening of switch 50, solenoid 46 is de-energized and lever 44 is urged by a spring 52 to an opposite direction to retract the toggle mechanism, unlock disc 25 and thus discontinue the drivable connection.

Pulley 10 is shown as fixed or splined to shaft 12. However, if it is desired, an overpowering or emergency disconnect may also be provided in which event the internal periphery of the pulley would be provided with a notch engaged by a roller carried by a spring pressed link, the latter being carried by the shaft, such provision being more fully described and claimed in copending application Serial No. 542,063, filed June 26, 1944.

Assuming that the craft or other vehicle provided with an automatic steering system is being controlled automatically, i. e., motor 23 is drivably connected to pulley 10, and that a situation arises wherein it is desired to take over control manually and disconnect the motor from the pulley, the human pilot opens switch 50 which de-energizes solenoid 46 whereupon the toggle mechanism is collapsed and links 36 and 37 retracted from out of engagement with spur gears 32 and 33 so that disc 25 is released for rotation relative to shaft 12 by spur gears 17 and 18 and the driving connection between the motor and the pulley is thus terminated and the pulley is thereafter free for operation by the human pilot. For reconnecting the drivable connection, switch 50 is closed so that the solenoid extends the toggle to lock spur gears 32 and 33 and disc 25.

Although a solenoid operated toggle mechanism has been illustrated, the solenoid may be replaced by a cable connected to lever 44 which is accessible to the human pilot. A pull on the cable by the pilot will urge lever 44 inwardly to extend the toggle mechanism to lock the spur gears 32 and 33 and disc 25 whereupon motor drive is communicated through spur gears 17 and 18, frame 14 and shaft 12 to pulley 10. By releasing the cable, lever 44 is urged in an opposite direction by spring 52 to retract the toggle mechanism and thereby unlock disc 25 for rotation by spur gears 17 and 18 whereupon the drivable connection between the motor and pulley is readily terminated.

Although but a single embodiment of the present invention has been illustrated and described in detail, it is to be expressly understood that the invention is not limited thereto. Various changes can be made in the design and arrangement of parts without departing from the spirit and scope of the invention as will now be understood by those skilled in the art. For a definition of the limits of the invention, reference will be had primarily to the appended claims.

I claim:

1. In combination, a driving member, a driven member, a shaft for operating said driven member in accordance with the operation of said driving member, a support carried by said shaft, means comprising a planet gear journalled in said support for rotation relative to said shaft on an axis out of alignment with the axis of rotation of said shaft and driven by said driving member, a pair of spaced, interconnected and internally toothed annular gears sleeved on said shaft, one of said annular gears meshing with said planet gear for rotation thereby of both of said annular gears relative to said shaft, a spur gear engageable with the other of said annular gears and normally driven thereby, means for locking said spur gear against rotation whereupon both of said annular gears are held against rotation and said planet gear is caused to ride on said one annular gear to thereby drive said shaft in accordance with the operation of said driving member, and means comprising a toggle mechanism for operating said locking means.

2. In combination, a driving member, a driven member, means comprising a shaft for operating said driven member in accordance with the operation of said driving member, a planet gear, a carrier supporting and connecting said planet gear for rotation to said shaft, said gear being driven by said driving member, internally toothed annular gear means sleeved on said shaft and meshing with said planet gear for rotation thereby relative to said shaft, a third gear means meshing with said annular gear means and journalled for rotation thereby in a support fixed relative to said annular gear, means comprising a pawl for engaging and locking said third gear against rotation whereupon said annular gear means is likewise locked against rotation and said planet gear is caused to ride on said annular gear means to thereby drive said shaft in accordance with the operation of said driving member, and means comprising a toggle mechanism for operating said pawl.

3. In combination, a driving member, a driven member, means comprising a shaft for operating said driven member in accordance with the operation of said driving member, a planet gear, a carrier supporting and connecting said planet gear for rotation to said shaft, said gear being driven by said driving member, a hollow element comprising a pair of spaced internally toothed members sleeved on said shaft, one of said toothed members meshing with said planet gear for rotation thereby of both of said toothed members relative to said shaft, a second gear meshing with the other of said toothed members and journalled for rotation thereby in a support fixed relative to said toothed members, and means comprising a solenoid operated toggle mechanism for locking said second gear against rotation whereupon said toothed members are likewise locked against rotation and said planet gear is caused to ride on said one toothed member to thereby drive said shaft in accordance with the operation of said driving member.

4. A reconnectable disconnect device comprising driving means and a driven member, means comprising a shaft for operating said driven member in accordance with the operation of said driving means, a planet gear, a carrier supporting and connecting said planet gear for rotation to said shaft, said gear being driven by said driving means, a hollow element sleeved on said shaft, a first internally toothed gear carried by said hollow element for meshing with said planet gear for rotation thereby relative to said shaft, a second internally toothed gear carried by said hollow element, a housing surrounding said hollow element, a spur gear meshing with said second internally toothed gear and supported by said housing for rotation by said second toothed gear, a pawl for locking said spur gear against rotation whereupon both said first and second internally toothed gears are locked against rotation and said planet gear is caused to ride on said first internally toothed gear to thereby drive said shaft in accordance with the operation of said driving means, and means for operating said pawl.

NORMAN B. MURPHY.

REFERENCES CITED

The following references are of record in the file of this patent:

UNITED STATES PATENTS

| Number | Name | Date |
|---|---|---|
| 1,122,924 | Henderson | Dec. 29, 1914 |
| 1,670,313 | Oswald | May 22, 1928 |
| 2,388,700 | Morrill | Nov. 13, 1945 |